United States Patent [19]

Imanari et al.

[11] Patent Number: 4,891,348
[45] Date of Patent: Jan. 2, 1990

[54] CATALYST FOR REMOVING NITROGEN OXIDES IN EXHAUST GASES

[75] Inventors: Makoto Imanari; Takeo Koshikawa, both of Ami; Akihiro Yamauchi, Koganei; Masayuki Hanada, Kitakyushu; Morio Fukuda, Kitakyushu; Kiyoshi Nagano, Kitakyushu, all of Japan

[73] Assignees: Mitsubishi Petrochemical Co., Ltd.; Mitsubishi Jukogyo Kabushiki Kaisha, both of Tokyo; Sakai Chemical Industry Co., Ltd., Osaka; Catalysts & Chemicals Industries, Co., Ltd.; Mitsubishi Petrochemical Engineering Co., Ltd., both of Tokyo, all of Japan

[21] Appl. No.: 77,644

[22] Filed: Jul. 24, 1987

[30] Foreign Application Priority Data

Jul. 25, 1986 [JP] Japan .................................. 61-173812
Jul. 29, 1986 [JP] Japan .................................. 61-178346
Oct. 24, 1986 [JP] Japan .................................. 61-251587

[51] Int. Cl.$^4$ .................... B01J 21/06; B01J 23/30; B01J 23/28; C01B 21/00

[52] U.S. Cl. .................................. 502/309; 423/239; 502/84; 502/217; 502/242; 502/350; 502/351

[58] Field of Search .......................... 502/217, 309, 350

[56] References Cited

U.S. PATENT DOCUMENTS

| 4,085,193 | 4/1978 | Nakajima et al. | 502/309 |
| 4,152,296 | 5/1979 | Okabe et al. | 502/217 |
| 4,405,505 | 9/1983 | Neri | 502/350 |
| 4,520,124 | 5/1985 | Abe et al. | 502/309 |

FOREIGN PATENT DOCUMENTS 2458888 6/1975 Fed. Rep. of Germany ...... 502/309

Primary Examiner—Paul E. Konopka
Attorney, Agent, or Firm—Wenderoth, Lind & Ponack

[57] ABSTRACT

A catalyst for removing nitrogen oxides in an exhaust gas, said catalyst containing a first group of many pores having a diameter of $1 \times 10^2$ Å to less than $1 \times 10^3$ Å and a second group of many pores having a diameter of $1 \times 10^3$ Å to $1.2 \times 10^5$ Å, the pore volume of the first group being at least 10% based on the total pore volume of the first group and the second group, and said catalyst comprising titanium and at least one metal selected from molybdenum, tungsten and vanadium as metal elements of catalytically active ingredients.

7 Claims, 2 Drawing Sheets

CATALYST FOR REMOVING NITROGEN OXIDES IN EXHAUST GASES

This invention relates to a catalyst for removing nitrogen oxides in exhaust gases. Specifically, it relates to a denitration catalyst for use in reducing nitrogen oxides contained in combustion exhaust gases from a fixed combustion device, such as a sintering furnace, a coke furnace or a boiler, with ammonia and removing them as non-toxic substances, and more specifically to a denitration catalyst which is not easily poisoned by an arsenic compound and/or a calcium compound that may be contained in combustion exhaust gases and in which the pores are not blocked by such foreign materials.

A method has been known to render nitrogen oxides (to be sometimes referred to as $NO_x$) contained in exhaust gases from various fixed combustion devices nontoxic by reducing them with a reducing gas such as ammonia. For use in this method, there have been proposed denitration catalysts comprising an oxide (partly a sulfate sometimes) of a combination of elements, for example vanadium-titanium, vanadium-tungsten-titanium or vanadium-aluminium. Many of these denitration catalysts leave problems still unsolved in regard to activity, strength, price, and durability to sulfur compounds or arsenic compounds contained in exhaust gases.

For example, coal combustion exhaust gases such as coal-burning boiler exhaust gases usually contain ashes which abrade catalysts. Hence, denitration catalysts now in practical use for denitrating such exhaust gases generally contain hardly any pores having a diameter of at least 1,000 Å in order to secure high abrasion resistance. Frequently, these catalysts are poisoned and rapidly lose activity during use particularly when the exhaust gases contain arsenic compound.

Some types of coal used as a fuel for boilers or the like, although depending upon its place of occurrence, discharge relatively large amounts of arsenic compounds or calcium compounds into exhaust gases. Particularly, in wet bottom-type boilers widely used in Europe, the coal ash discharged from a combustion chamber is again put into it. Consequently, arsenic and calcium are concentrated, and poisoning of catalysts by these elements is a serious problem. In one example, the activity of a denitration catalyst decreased to several times as low as its activity in the initial stage after the lapse of several months.

Arsenic compounds have long been known to be activity poisoning substances against catalysts used in various reactions. A typical poisoning action of arsenic compounds is seen in hydrogenation reaction with a platinum or palladium catalyst in the liquid phase or a reaction of synthesizing anhydrous sulfuric acid from $SO_2$ using a vanadium pentoxide catalyst.

This catalyst poisoning action of arsenic is similarly observed in the reaction of reducing $NO_x$ in exhaust gases to render them non-toxic. Many denitration catalysts rapidly lose activity in the presence of arsenic in exhaust gases and become useless from an industrial viewpoint.

Japanese Patent Publication No. 22839/1977 discloses a catalyst comprising titanium and molybdenum as catalytically active ingredients and having a group of pores with an average pore diameter of about 100 to 1,000 Å. This catalyst shows high activity in a reaction of reducing nitrogen oxides in exhaust gases. But if an arsenic compound exists in the exhaust gases, the catalyst is poisoned by it.

Japanese Patent Publication No. 14846/1986 discloses a catalyst which shows good catalytic activity even in a low temperature region in the reductive decomposition of nitrogen oxides with ammonia. This catalyst comprises an alumina carrier and platinum, copper, silver, chromium, manganese, vanadium, tungsten, molybdenum, titanium, tin or cerium or a compound thereof supported on the carrier. The alumina carrier contains at least 0.14 cc/g as a total volume of pores having a pore diameter of from 1000 Å to 100,000 Å and at least 0.14 cc/g as a total volume of pores having a pore diameter of less than 1,000 Å, and has at least one clear maximum value each in a pore diameter of 1,000 Å to 100,000 Å and a pore diameter of less than 1,000 Å in its pore distribution curve. This patent document, however, is quite silent on catalyst poisoning by arsenic and/or calcium.

Japanese Laid-Open Patent Publication No. 230748/1986 laid-open on October 15, 1986 which was after the first priority date of the present application discloses a catalyst which can reduce $NO_x$ in an exhaust gas containing a large amount of dust with ammonia over an extended period of time while inhibiting the decrease of catalyst activity by the dust, characterized in that a catalytically active substance-formed portion is such that at least 10% of its total pore volume is occupied by volumes of pores having a pore diameter of 0.8 to 8.0 micrometers.

It is an object of this invention o provide a highly active catalyst for use in reducing nitrogen oxides in exhaust gases with ammonia.

Another object of this invention is to provide a catalyst for continuously reducing nitrogen oxides in an exhaust gas containing an arsenic compound and a calcium compound while maintaining high activity over a long period of time without being poisoned by the arsenic compound and without its pores being blocked by the calcium compound.

Still another object of this invention is to provide a catalyst for reducing nitrogen oxides in an exhaust gas which has a first group of pores having a relatively small diameter and a second group of pores having a relatively large diameter, and which is not affected by an arsenic compound and a calcium compound, or is little affected by them over a very long period of time.

Yet another object of this invention is to provide a catalyst for reducing nitrogen oxides in an exhaust gas which can maintain its catalytic activity by removing materials which deposit on the surface of the catalyst and affect its catalytic performance, such as an arsenic compound, a calcium compound, silica, sodium sulfate, and a vanadium compound, by wear or abrasion with the dust in the exhaust gas.

Further objects of the invention alone with its advantages will become apparent from the following description.

According to this invention, these objects and advantages are achieved by a catalyst for removing nitrogen oxides in an exhaust gas, said catalyst containing a first group of many pores having a diameter of $1 \times 10^2$ Å to less than $1 \times 10^3$ Å and a second group of many pores having a diameter of $1 \times 10^3$ Å to $1.2 \times 10^5$ Å, the pore volume of the first group being at least 10% based on the total pore volume of the first group and the second group, and said catalyst comprising titanium and at least one metal selected from molybdenum, tungsten and vanadium as metal elements of catalytically active ingredients.

Figure 1:
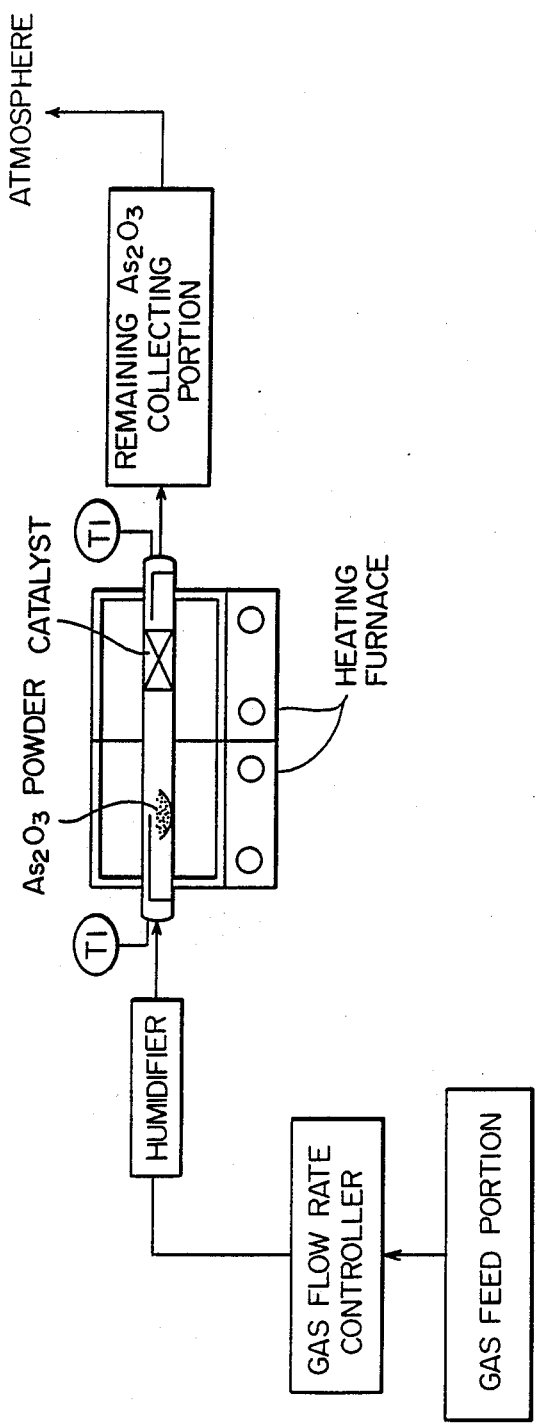
FIG. 1 illustrates a device for degrading the catalyst by arsenic.

The catalyst of this invention has a first group of pores having a relatively small diameter and a second group of pores having a relatively large diameter, and the pore volume of the first group of pores accounts for at least 10% of the total volume.

As a result of containing the first group of pores having a relatively small diameter and the second group of pores having a relatively large diameter, the decrease of the catalytic activity by an arsenic compound can be inhibited and high activity can be imparted to the catalyst. Furthermore, the catalyst surface undergoes proper abrasion (self-cleaning) by the dust in an exhaust gas, and the activity of the catalyst can be maintained.

In the present invention, the term "total pore volume" means the sum of the pore volume of the first group of pores and the pore volume of the second group of pores.

In the catalyst of this invention, the first group of pores has a pore volume of 10 to 90 % based on the total pore volume. Preferably, pores having a diameter of $1 \times 10^2$ to $3 \times 10^2$ in the first group have a pore volume of 10 to 30% based on the total pore volume.

In the catalyst of this invention, the second group of pores have a pore volume of 10 to 90% based on the total pore volume. Preferably, pores having a diameter of $1 \times 10^3$ to $3 \times 10^4$ Å in the second group have a pore volume of 20 to 40% based on the total pore volume.

The volume of the second group of pores having a relatively large diameter is desirably as large as possible in order to inhibit poisoning or blocking of pores by an arsenic compound and/or a calcium compound. However, if the volume of the second group exceeds 90% of the total pore volume, the abrasion resistance of the catalyst is decreased. Desirably, therefore, the volume of the second group of pores is not more than 90%. If the volume of the second group of pores is less than 10% of the total pore volume, there is an increasing tendency toward the degradation of catalytic activity by an arsenic compound and a calcium compound.

The catalyst of this invention contains titanium and at least one metal selected from the group consisting of molybdenum, tungsten and vanadium as elements of catalytically active ingredients. The atomic ratio of titanium to the other metal may be varied over a range of from 1:0.001 to 1:1, preferably from 1:0.01 to 1:1 (in the case of vanadium; 1:0.001 to 1:0.3), more preferably from 1:0.03 to 1:1 (in the case of vanadium; 1:0.001 to 1:0.2).

Titanium and at least one element selected from the group consisting of molybdenum, tungsten and vanadium may be in the form of oxides or sulfates as catalytically active ingredients. When titanium is used in the form of titanium oxide, it desirably has a crystallite size of 150 to 500 Å in order to increase resistance to arsenic that may be contained in the exhaust gas.

The catalyst of this invention has a total pore volume of preferably 0.1 to 0.7 ml, more preferably 0.3 to 0.45 ml, per gram of catalyst.

The catalyst of this invention has the first group of pores and the second group of pores, and shows very high resistance to an arsenic compound. The reason for this is not entirely clear. It is presumably because arsenic adsorbed on the catalyst surface does not stay in the surface layer of the catalyst, but successively advances into the interior of the catalyst, and even if the same amount of arsenic is adsorbed, the concentration of arsenic in the surface layer of the catalyst of this invention does not readily increase as compared with other catalysts. Since it is thought that reduction of nitrogen oxides takes place at a site, about 100 micrometers deep, in the surface layer of the denitration catalyst, the catalyst of this invention is not easily affected by arsenic since as stated above arsenic adsorbed on its surface migrates to other sites not involved in the reduction of nitrogen oxides.

In an especially preferred embodiment, the catalyst of this invention is characterized by the following features.

(1) It contains oxides of titanium and molybdenum as catalytically active ingredients. The amount of molybdenum calculated as molybdenum oxide is at least 3% by weight, and the atomic ratio of titanium to molybdenum is in the range of 1:0.01–10.

(2) It has a first group of pores having an average diameter in the range of about $10^2$ to $10^3$ Å and a second group of pores having an average diameter in the range of about $1 \times 10^3$ to $3 \times 10^4$ Å, and the volume of the second group of pores is in the range of 10 to 50% of the total pore volume of the catalyst.

As stated above, the above catalyst contains titanium and molybdenum in the form of oxides as active ingredient. The atomic ratio of titanium to molybdenum is in the range of 1:0.01–10, preferably 1:0.05–1.0. Furthermore, it contains molybdenum in an amount of at least 3% by weight, preferably at least 15% by weight, calculated as molybdenum oxide.

Examples of titanium sources that can be used in preparing the above catalyst include titanium oxide, titanium tetrachloride, titanium sulfate, titanium hydroxide, titanyl sulfate (TiOS ), meta-titanic acid, titania-silica, titania-zirconia, titania-zirconia-silica, titanium oxalate and tetraisopropyl titanate.

Examples of molybdenum sources that can be used in preparing the above catalyst include molybdenum oxide, ammonium molybdate, ammonium paramolybdate, molybdic acid, silicomolybdic acid, and phosphomolybdic acid.

The catalyst of this invention may be produced by methods known per se used in the production of catalysts, for example the precipitation method and the mixing method.

For example, the above catalyst containing titanium and molybdenum may be prepared by adding an alkaline compound such as aqueous ammonia, alkali hydroxides, alkali hydrogen carbonates and alkali carbonates to an aqueous solution of a water-soluble titanium compound such as titanium tetrachloride or titanium sulfate to neutralize the titanium compound and form titanium hydroxide, adding an aqueous solution, slurry or powder of such a molybdenum material as exemplified above, and mixing them fully. In this method, a slurry of titanium oxide or meta-titanic acid, for example, may be used instead of using the precipitate of titanium hydroxide.

The mixture prepared as above is dried, mixed with a suitable molding aid such as graphite or polyethylene glycol, molded by tableting or extrusion, and then calcined.

In the above method, it is necessary to add solid particles capable of being removed by burning in the stage of calcination in any of the steps prior to the molding and calcination steps and mix them uniformly with the catalyst-forming mixture. The second group of pores having a relatively large diameter are formed after the added solid particles are burnt and removed in the calcination step.

The solid particles may, for example, include celluloses such as microcrystalline cellulose and methyl cellulose, thermoplastic resins such as polyethylene, polypropylene, carbowax, polyacrylamide, -polystyrene and acrylic resins, Poval, sugars such as lactose and corn starch, wheat flour, and low-molecular-weight compounds such as ammonium carbonate, urea and ammonium stearate. Preferably, the solid particles have an average particle diameter of about 0.1 to 3 micrometers.

Alternatively, the above catalyst may be prepared by heat-treating titanium oxide at a temperature of about 350° to 800° C., pulverizing it, sieving it, thoroughly mixing it with an aqueous solution, slurry or powder of a molybdenum material, optionally drying the mixture, adding a molding aid, molding the mixture and calcining the molded product. In this method, voids corresponding to the second group of pores having a relatively large diameter are formed in the titanium oxide particles at the time of heat-treating titanium oxide.

In the above method, the calcination is carried out usually at 300° to 600° C. for a period of about 1 to 10 hours.

The above methods are only illustrative. The catalyst of this invention may be used in a form having the catalytically active ingredients deposited on a porous carrier such as silica and alumina, or in a form in which a carrier component such as silica, alumina, magnesia, zirconia, acid terra alba (Japanese acid clay), active terra alba (activated clay) or diatomaceous earth is fully kneaded with the catalytically active ingredients.

Thus, the catalyst of this invention preferably has a total pore volume (the sum of the volume of the first group of pores and the volume of the second group of pores) of 0.1 to 0.7 ml per gram of catalyst, more preferably about 0.2 to 0.5 ml per gram of catalyst, especially preferably about 0.3 to 0.45 ml per gram of catalyst.

To inhibit poisoning or pore blockage by an arsenic compound and/or a calcium compound, the total pore volume of the catalyst is desirably as large as possible. If it exceeds 0.7 ml/g, however, the abrasion resistance of the catalyst becomes extremely low. For practical purposes, the catalyst desirably has a total pore volume of not more than 0.7 ml/g. If the total pore volume of the catalyst is less than 0.1 ml/g, the catalyst has satisfactory abrasion resistance but its activity tends to decrease by an arsenic compound and/or a calcium compound.

The catalyst of this invention may be of any shape, for example, in the shape of a honeycomb, a sphere, a cylinder or a plate. Preferably, it is a honeycomb-like structure.

Nitrogen oxides to be removed in the presence of the catalyst of this invention include, for example, NO, $N_2O_3$, $NO_2O_4$ N and $N_2O_5$.

Reduction of NO with ammonia proceeds as schematically shown below.

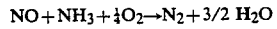

$$NO + NH_3 + \tfrac{1}{4}O_2 \rightarrow N_2 + 3/2\ H_2O$$

The amount of ammonia is determined according to the ratio of denitration required in accordance with the above reaction. Usually, it is about 0.3 to 1.5 moles per mole of the nitrogen oxide.

Contacting of an exhaust gas with ammonia gas is carried out preferably at 100 to 600° C., more preferably 100° to 550° C., especially preferably 200° to 500° C.

Treatment of the exhaust gas using the catalyst can be advantageously performed by passing the exhaust gas and ammonia through a passage filled with the catalyst. The space velocity (SV) is 1,000 to 100,000 hr$^{-1}$, preferably 3,000 to 50,000 hr$^{-1}$, especially preferably 5,000 to 15,000 hr$^{-1}$.

The pressure is preferably atmospheric pressure to about 10 kg/cm2.

The catalyst of this invention has an excellent performance in treating nitrogen oxides in an exhaust gas containing an arsenic compound and/or a calcium compound, and is particularly suited for the treatment of an exhaust gas containing at least about 0.001 ppm, preferably about 0.01 to about 1 ppm, for example, of $As_2O_3$ and having a dust concentration of, for example, 10 to 30 g/Nm$^3$ The exhaust gas may contain, for example, 100 to 1,000 ppm of nitrogen oxides, mainly nitrogen monoxide, 200 to 2,000 ppm of sulfur oxides, mainly sulfur dioxide, 1 to 10% by volume of oxygen, 5 to 20% by volume of carbon dioxide gas, and 5 to 20% by volume of steam.

The following examples illustrate the present invention in greater detail.

The poisoning resistance of the catalyst of this invention to an arsenic compound was measured by the following procedure.

In a device for forcibly degrading the catalyst by arsenic as shown in FIG. 1 of the accompanying drawings, the catalyst was contacted with a gas containing $As_2O_3$, and after the lapse of a predetermined period of time, the catalyst was taken out.

The NO reducing activity of the so degraded catalyst and that of the non-degraded catalyst were measured, and from the degree of decrease of activity, the poisoning resistance to arsenic was evaluated.

The catalyst treating temperature in the above degrading device can be set at any value within the range of temperatures at which the catalyst is actually used in a NO$_x$ reducing device. The temperature at which $As_2O_3$ powder is heated is set according to the required concentration of As Usually, the desired concentration can be obtained at temperatures within the range of 250° to 400° C.

Forced degradation of the catalyst by arsenic in the following Examples 1 and 2 and Comparative Examples was carried out under the following conditions.

Catalyst temperature: 350 ° C.
Time: 5 hours
Gas flow rate: 2 liters/min.
Gas composition: 25 to 100 ppm of 1000 ppm of $SO_2$, 5% of $O_2$, 10% of $H_2O$ (steam), and the balance $N_2$.

The NO reducing activity was evaluated under the following conditions.

Reactor: quartz reaction tube with an inside diameter of 30 mm
Catalyst: 20 ml (6 mm 0×6 mm)
Gas flow rate: 400 Nl/hr (SV: 20,000 l/hr)
Reaction temperature: 380 ° C.
Gas composition: 100 ppm of NO, 100 ppm of $NH_3$, 800 ppm of S02, 4% of $O_2$, 12% of $CO_2$, 9% of $H_2O$ (steam) and balance $N_2$.

For analysis of NO, the concentrations of NO at the introducing portion and the outlet portion of the reactor were measured using a NO/NO$_x$ analyzer (Model 951, made by Toshiba-Beckmann Co., Ltd.) in accordance with the chemiluminescence detecting method.

In the present invention, the NO removal ratio is defined as follows:

NO removal ratio (%) =

$$\frac{\text{NO concentration at the introducing portion (ppm)} - \text{NO concentration at the outlet portion (ppm)}}{\text{No concentration at the introducing portion (ppm)}} \times 100$$

EXAMPLE 1

A slurry of meta-titanic acid [TiO(OH)$_2$] was taken in an amount of 220 g as TiO$_2$, and a solution of 54 g of ammonium p-molybdate in 500 ml of hot water was added to it. They were sufficiently mixed and then dried.

To the resulting powder was added 1% by weight of polyethylene oxide (Alcox E-30, a tradename for a product of Meisei Chemical Industry Co., Ltd.), and wet-milled for 30 minutes together with about 100 ml of water.

To the mixture was added 13 g of cellulose Avicel TG-101, a tradename for a product of Asahi Chemical Industry Co., Ltd.), and they were mixed in the wet state for 5 minutes. The mixture was extruded into a product having a diameter of 6 mm.

The molded product was dried, and then calcined at 500° C. for 4 hours. The resulting catalyst had a Ti:Mo atomic ratio of 9:1 and was of such a pore structure that its total pore volume was 0.38 cc/g and it had a pore distribution (measured by the mercury penetration method) shown by a one-dot chain line (curve a) in FIG. 2 of the accompanying drawings.

To determine the poisoning resistance of this catalyst to arsenic, the reaction activities before and after forced degradation by arsenic were measured by the above forced arsenic degradation method and the reaction activity measuring method. The results were as follows:

|  | NO removal ratio (%) |
| --- | --- |
| Before forced arsenic degradation | 76.4 |
| After forced arsenic degradation | 62.2 |

EXAMPLE 2

Three hundred and fifty grams of titanium sulfate 24% as Ti(SO$_4$)$_2$] was taken, and diluted to about 1 liter with distilled water. The resulting solution was added dropwise to aqueous ammonia to form a precipitate. The precipitate was well washed with water and then filtered. To the resulting precipitate was added 15.7 g of molybdic acid (H$_2$MoO$_4$.H$_2$O), and they were mixed for 2 hours. The mixture was dried and the dried powder was mixed in the wet state with 5% by weight of Avicel TG-101, 1% by weight of polyethylene oxide and a suitable amount of water for 5 minutes. The mixture was extruded into a product having a diameter of 6 mm.

The molded product was calcined at 350° C. for 2 hours, and pulverized for 5 minutes by a kneader.

Polyethylene oxide (1% by weight) and a suitable amount of water were added and mixed with the pulverized product in the wet state for 5 minutes, and again extruded into a product having a diameter of 6 mm. The molded product was calcined at 50° C. for 4 hours and calcined.

Figure 2:
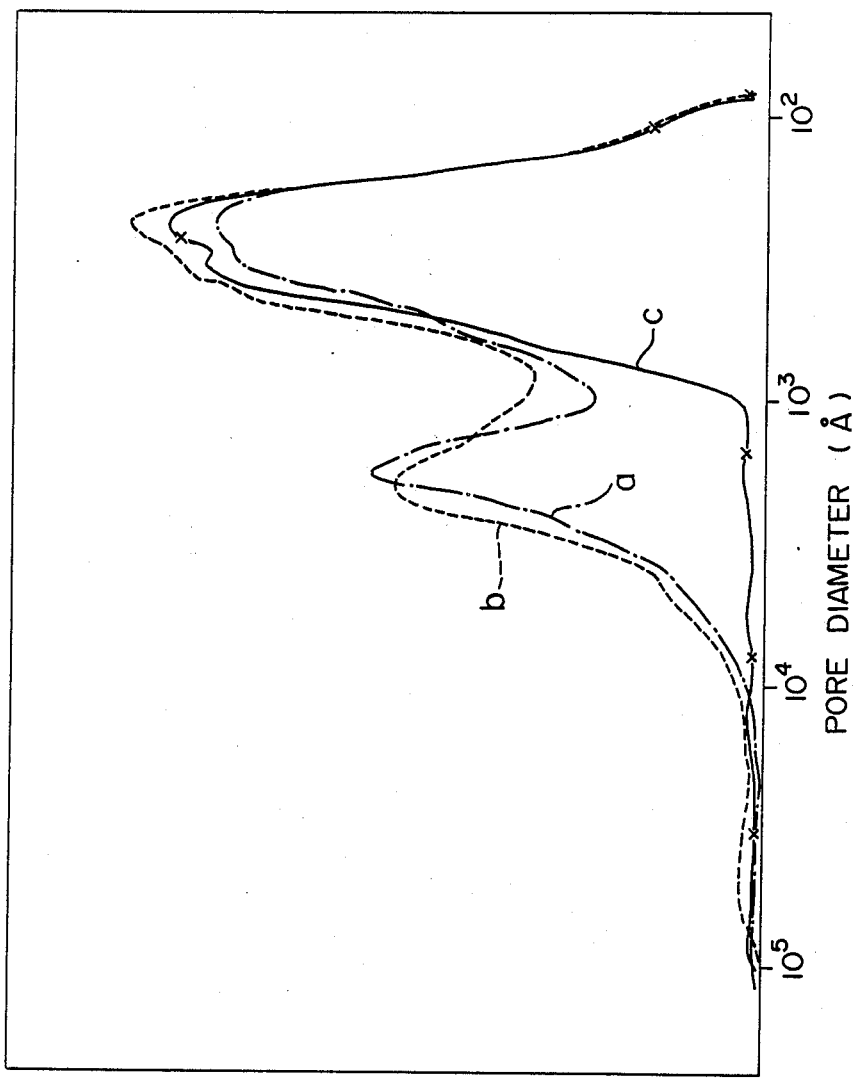
FIG. 2 is a graph indicating the pore distribution of catalysts measured by the mercury distribution method.

The resulting catalyst had a Ti:Mo atomic ratio of 8:2 and was of such a pore structure that its total pore volume was 0.41 cc/g and it had a pore distribution shown by a dotted line (curve b) in FIG. 2 of the accompanying drawings.

The poisoning resistance of the catalyst to arsenic was measured in the same way as in Example 1, and the following results were obtained.

|  | NO removal ratio (%) |
| --- | --- |
| Before forced arsenic degradation | 74.7 |
| After forced arsenic degradation | 63.6 |

COMPARATIVE EXAMPLE 1

A slurry of meta-titanic acid [TiO(OH)$_2$] was taken in an amount corresponding to 220 g of TiO$_2$, and a solution of 54 g of ammonium paramolybdate in 500 ml of hot water was added to it. They were thoroughly mixed, and then dried.

The resulting powder was mixed with 1% by weight of polyethylene oxide, and by addition of about 100 ml of water, wet-milled for 30 minutes. The milled mixture was extruded into a product having a diameter of 6 mm. The molded product was dried and then calcined at 500° C. for 4 hours.

The resulting catalyst had a Ti:Mo atomic ratio of 9:1 and was of such a pore structure that its total pore volume was 0.31 cc/g and it had a pore distribution shown by a solid line (curve c) in FIG. 2 of the accompanying drawings.

The poisoning resistance of the catalyst to arsenic was measured in the same way as in Example 1, and the following results were obtained.

|  | NO removal ratio (%) |
| --- | --- |
| Before forced arsenic degradation | 78.3 |
| After forced arsenic degradation | 38.1 |

EXAMPLE 3

(1) Preparation of a powder

A solution of TiOS in a concentration of 10% and a solution of acidic silica sol by weight as TiO$_2$ and a solution of acidic silica sol having an SiO$_2$ concentration of 20% by weight were gradually added to a 15% aqueous solution of ammonia, and the pH of the mixed solution was adjusted to 8.5 to 9. The mixed solution was dehydrated, and the resulting cake was dried, and calcined at 600° C. to obtain a powder (A).

Separately, meta-titanic acid and paratungstic acid were mixed in a weight ratio of 85:15 by weight calculated as oxides, and after adjusting the pH to 8.5 to g with 15% aqueous ammonia and dehydration, the resulting cake was dried and calcined at 600 ° C. to obtain a powder (B).

(2) Preparation of a catalyst

One kilogram of the powder (A) and 16.56 kg of the powder (B) were charged into a vessel and mixed with deionized water and 15% aqueous ammonia to form a solution having a pH of 9. Then, ammonium metavanadate in an amount of 0.14 kg as and 0.2 kg of monoethanolamine were added. The mixture was heated for 30 minutes, and then 1 kg of glass fibers, 1 kg of activated clay and 0.2 kg of polyethylene oxide were added. The mixture was kneaded for 2 hours and Avicel was added in an amount of 5% by weight based on the dry weight of the catalyst. They were mixed for 30 minutes while the water content was adjusted. The kneaded mixture having a water content suitable for extrusion was molded into a honeycomb structure by a two-stage single-screw vacuum extruder. The honeycomb structure was dried and then calcined at 600° C. for 3 hours to form a catalyst.

(3) The catalyst obtained in section (2) was tested for poisoning using an exhaust gas containing an arsenic compound and a calcium compound.

1. Procedure Fly ash containing large amounts (shown below) of arsenic and calcium, which was left after burning of coal, was carried in a C heavy oil combustion gas and contacted with a sample catalyst kept at 38° C.

2. Conditions (1) Concentration of poisoning components in the fly ash
4,000 ppm
CaO: 29.5 %
MgO: 8.1 %
Remainder: $SiO_2$, and Fe
(2) Poisoning conditions
Sample catalyst honeycomb structure with a size of 25 mm×25 mm×30 mm
Gas composition :
Fly ash: 500 g/$Nm^3$
SV: 5000 $h^{-1}$
$NO_x$: 120 ppm
$SO_x$: 450 ppm
$H_2O$: 11 %
$C_2$ 12%
$N_2$: balance In a denitration test, a sample having a size of 25 mm×25 mm and 300 mm length was cut out from the honeycomb catalyst and packed in a flowing-type reactor. The denitration ratio was measured under the following conditions. The concentration of nitrogen oxides $NO_x$ in the gas was measured by a chemiluminescent nitrogen oxide analyzer before and after contact with the catalyst. The denitration ratio was calculated from the following equation.

Denitration ratio (%) =

$$\frac{NO_x \text{ in the uncontacted gas (ppm)} - NO_x \text{ in the contacted gas (ppm)}}{NO_x \text{ in the uncontacted gas)}} \times 100$$

Testing conditions

Catalyst shape: honeycomb (25×25 mm; 9 thickness 1.25 mm; length 300 mm)
Reaction temperature: 380 ° C.
SV: 10000 hr − 1
Gas composition: $NO_x$=180 ppm
$NH_3$=216 ppm
$O_2$=2%
$SO_2$=500 ppm
$H_2O$ =100 %
$N_2$=balance The abrasion strength of the catalysts was measured by the following method.

Air carrying 44 g/$Nm^3$ of silica sand classified to a particle diameter of 350 to 450 micrometers was contacted with each of honeycomb catalyst samples having the same dimension at a rate of 17 Nm/sec to abrade the catalyst forcibly. The abrasion strength of the catalyst was defined as a quotient (in percent) obtained by dividing the amount of weight loss of the catalyst as a result of forced abrasion by the weight of the catalyst before forced abrasion.

The results are shown in Table 1.

EXAMPLE 4

A honeycomb catalyst was molded, dried and calcined at 600° C. for 3 hours in the same way as in Example 3 except that the amount of Avicel added was changed to 10% by weight. The catalyst was subjected to the same poisoning test and abrasion test as in Example 3, (3). The results are shown in Table 1.

EXAMPLE 5

A honeycomb catalyst was molded, dried and calcined at 600° C. for 3 hours in the same way as in Example 3 except that the amount of Avicel added was changed to 15% by weight. The catalyst was subjected to the same poisoning test and abrasion test as in Example 3, (3). The results are shown in Table 1.

COMPARATIVE EXAMPLE 2

Powder (B) (17.56 kg) was put into a kneader and fixed with deionized water and 15% aqueous ammonia to form a solution having a pH of 9. Then, 0.14 kg, as $V_2O_5$, of ammonium metavanadate and 0.2 kg of monoethanolamine were added. The mixture was heated for 30 minutes, and 1 kg of glass fibers, 1 kg of activated clay and 0.2 kg of polyethylene oxide was added and they were kneaded for 3 hours to obtain a kneaded mixture (C) having a water content suitable for extrusion. The kneaded mixture was molded into a honeycomb structure by a two-stage single-screw vacuum extruder, dried and then calcined at 600° C. for 3 hours. The catalyst was subjected to the same poisoning test and abrasion test as in Example 3, (3). The results are shown in Table 1.

EXAMPLE 6

Avicel was added to the kneaded mixture (C) obtained in Comparative Example 2 in an amount of 20% by weight based on the dry weight of the catalyst, and they were mixed for 20 minutes while the water content was adjusted with deionized water. The resulting kneaded mixture having a water content suitable for extrusion was extruded, dried, and calcined at 600° C. for 3 hours. The catalyst was subjected to the same poisoning test and abrasion test as in Example 3, (3). The results are shown in Table 1.

TABLE 1

| Example | Pore volume (ml/g) | Volume of pores with a diameter of at least 1000 Å (ml/g) | Abrasion strength (%) | Changes of denitration ratio with time (%) | | | |
|---|---|---|---|---|---|---|---|
| | | | | 0 hr | 56 hrs | 22 hrs | 1000 hrs |
| 3 | 0.33 | 0.07 | 8.0 | 78.5 | 72.9 | 70.8 | 64.2 |
| 4 | 0.37 | 0.08 | 12.5 | 80.1 | 74.6 | 73.0 | 70.2 |
| 5 | 0.41 | 0.10 | 19.3 | 81.6 | 78.2 | 77.5 | 76.3 |
| 2. (*) | 0.31 | 0 | 6.0 | 76.8 | 68.9 | 64.0 | 51.8 |
| 6 | 0.45 | 0.15 | 28.1 | 86.1 | 83.7 | 83.0 | 82.0 |

(*): Comparative Example

It is seen from Table 1 that the catalysts of this invention shown in Examples 3, 4 and 5 have practical abrasion strengths and small degrees of activity degradation according to changes-with time. The catalyst of Example 6 has a small degree of activity degradation according to changes with time, but slightly lower abrasion strength.

EXAMPLE 7

(1) Production of starting powders

A solution of $TiOSO_4$ having a concentration as $TiO_2$ of 10% by weight and an acidic silica sol solution having an $SiO_2$ concentration of 20% by weight were gradually added to a 15% aqueous solution of ammonia with stirring so that the weight ratio of $TiO_2/SiO_2$ was 85/15. After adjusting the pH to 8.5 to 9, the solution was dehydrated. The resulting cake was dried, and then calcined at 600° C. to obtain a powder (A). Separately, metatitanic acid and paratungstic acid as oxides were mixed at a weight ratio of 85:15. A 15% aqueous solution of ammonia was added to form a solution having a pH of 8.5 to 9. The solution was dehydrated, and the resulting cake was dried, and then calcined at 600° C. to obtain a powder (B).

(2) Fifteen kilograms of anatase-type titanium dioxide powder having a specific surface area of 45 $m^2/g$ was put into a kneader, and 10 liters of deionized water and 1.5 kg of 45 wt.% oxalic acid were added, followed by kneading. Then, 1 kg of the powder (A), 0.5 kg of sericite, 0.84 kg of glass fibers, 0.23 kg of vanadyl sulfate and 1.5 kg of ammonium paratungstate were added and kneaded under heat. Polyethylene oxide (0.1 kg) was added to the kneaded mixture and then they were kneaded for 30 minutes. The kneaded mixture was extruded into a honeycomb structure, dried, and then calcined at 600° C. for 3 hours to obtain a catalyst.

The catalyst was subjected to the same poisoning test and abrasion test as described in Example 3, (3) The results are shown in Table 2.

EXAMPLE 8

The powder (A) (2.5 kg) and 15.1 kg of the powder (B) were charged into a kneader and mixed with deionized water and aqueous ammonia to form a solution having a pH of 8.5. Then, ammonium metavanadate in an amount of 0.15 kg as .and 0.2 kg of monoethanolamine were added. The mixture was kneaded under heat for 30 minutes, and then 1 kg of glass fibers, 1 kg of activated clay, and 0.2 kg of polyethylene oxide and 0.7 kg of polyvinyl alcohol were added. The mixture was kneaded for 2 hours and Avicel was added in an amount of 10% by weight based on the dry weight of the catalyst. They were kneaded for 30 minutes while the water content was adjusted. The kneaded mixture having a water content sitable for extrusion was molded into a honeycomb structure by a two-stage single-screw vacuum extruder. The honeycomb structure was dried and then calcined at 600° C. for 3 hours to form a catalyst.

The catalyst was subjected to the same poisoning test and abrasion test as described in Example 3, (3). The results are shown in Table 2.

TABLE 2

| Example | Pore volume (ml/g) | Volume of pores with a diameter of at least 1000Å (ml/g) | Abrasion strength (%) | Pre-poisoning time (hours) and denitration ratio (%) | | | |
|---|---|---|---|---|---|---|---|
| | | | | 0 | 56 | 220 | 1000 |
| 7 | 0.23 | 0.06 | 6.0 | 77.6 | 70.6 | 67.3 | 59.1 |
| 8 | 0.40 | 0.18 | 20 | 82.5 | 77.6 | 76.4 | 74.3 |

It is seen from Table 2 that the catalysts of this invention shown in Examples 7 and 8 had practical abrasion strength and exhibit excellent durability to poisoning by an arsenic compound and a calcium compound.

What is claimed is:

1. A catalyst for removing nitrogen oxides in an exhaust gas, said catalyst containing a first group of pores having a diameter of $1 \times 10^2$ Å to less than $1 \times 10^3$ Å and a second group of pores having a diameter of $1 \times 10^3$ Å to $1.2 \times 10^5$ Å, the pore volume of the first group being 10% to 90% based on the total pore volume of the first group and the second group, and said catalyst comprising a catalytically effective amount of titanium oxide and at least one metal oxide selected from molybdenum oxide, tungsten oxide and vanadium oxide and having a total pore volume of 0.1 to 0.7 ml/g of catalyst, the atomic ratio of titanium to the other metal being 1:0.001–1.

2. The catalyst of claim 1 wherein in the first group of pores, those which have a diameter of $1 \times 10$ to $2 \times 10^2$ Å have a pore volume of 10 to 30% based on the total pore volume.

3. The catalyst of claim 1 wherein the pore volume of the second group is 10 to 90% based on the total pore volume of the catalyst.

4. The catalyst of claim 1 wherein in the second group of pores, those pores which have a diameter of $1 \times 10^3$ to $10^3$ to $10^4$ Å have a pore volume of 20 to 40% based on the total pore volume of the catalyst.

5. The catalyst of claim 1 wherein the atomic ratio of titanium to the other metal is 1:0.01–1.

6. The catalyst of claim 1 which has a total pore volume of 0.3 to 0.45 ml/g of catalyst.

7. The catalyst of claim 1 wherein the atomic ratio of titanium to vanadium is 1:0.001 to 1:0.3.

* * * * *